April 21, 1925.  1,534,036
T. STENHOUSE ET AL
GLASS FORMING MACHINE
Filed Sept. 29, 1922   3 Sheets-Sheet 3
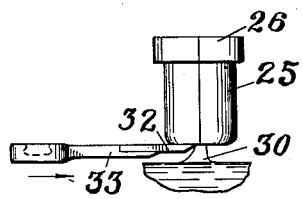
FIG-7-
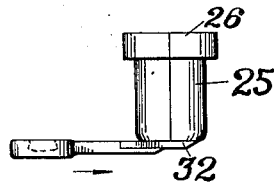
FIG-8-
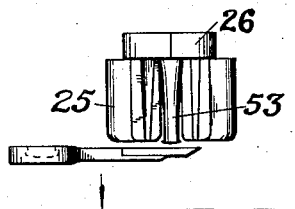
FIG-9-
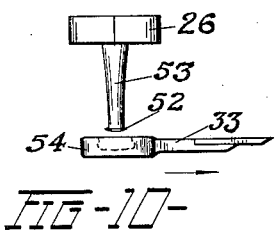
FIG-10-
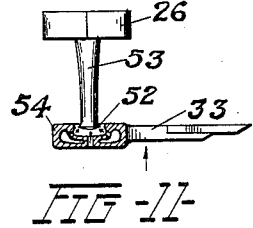
FIG-11-
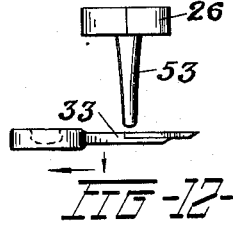
FIG-12-
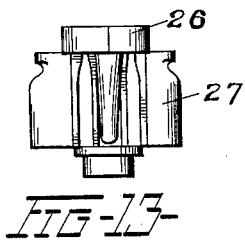
FIG-13-
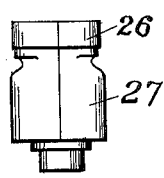
FIG-14-
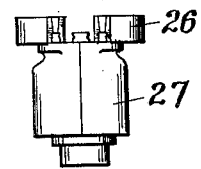
FIG-15-
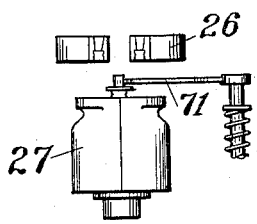
FIG-16-
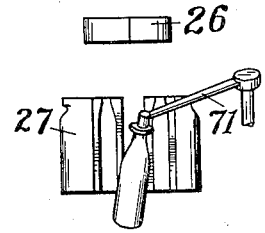
FIG-17-
INVENTORS
THOMAS STENHOUSE
LEONARD D. SOUBIER
BY J.F.Rule
THEIR ATTORNEY Patented Apr. 21, 1925.

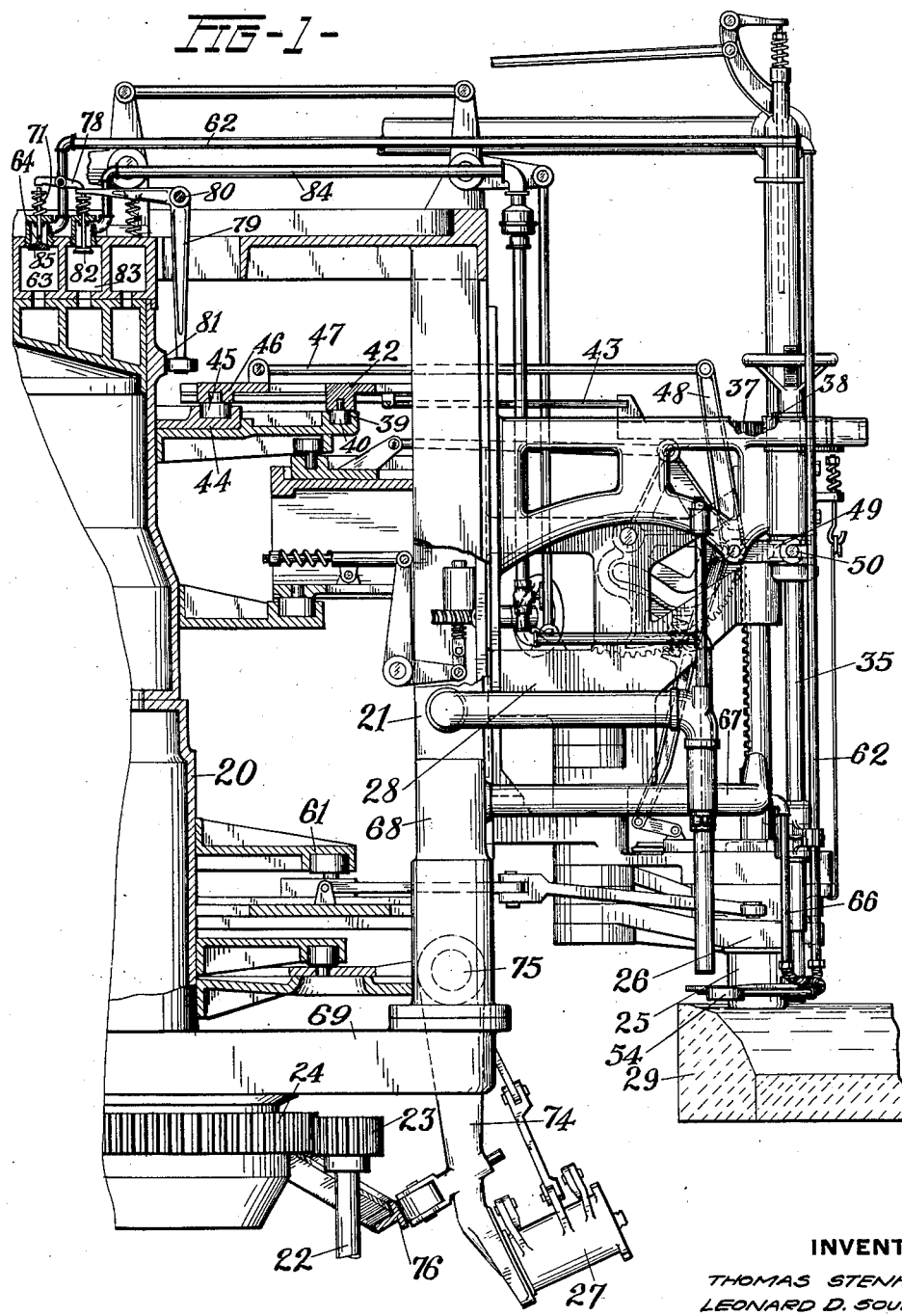

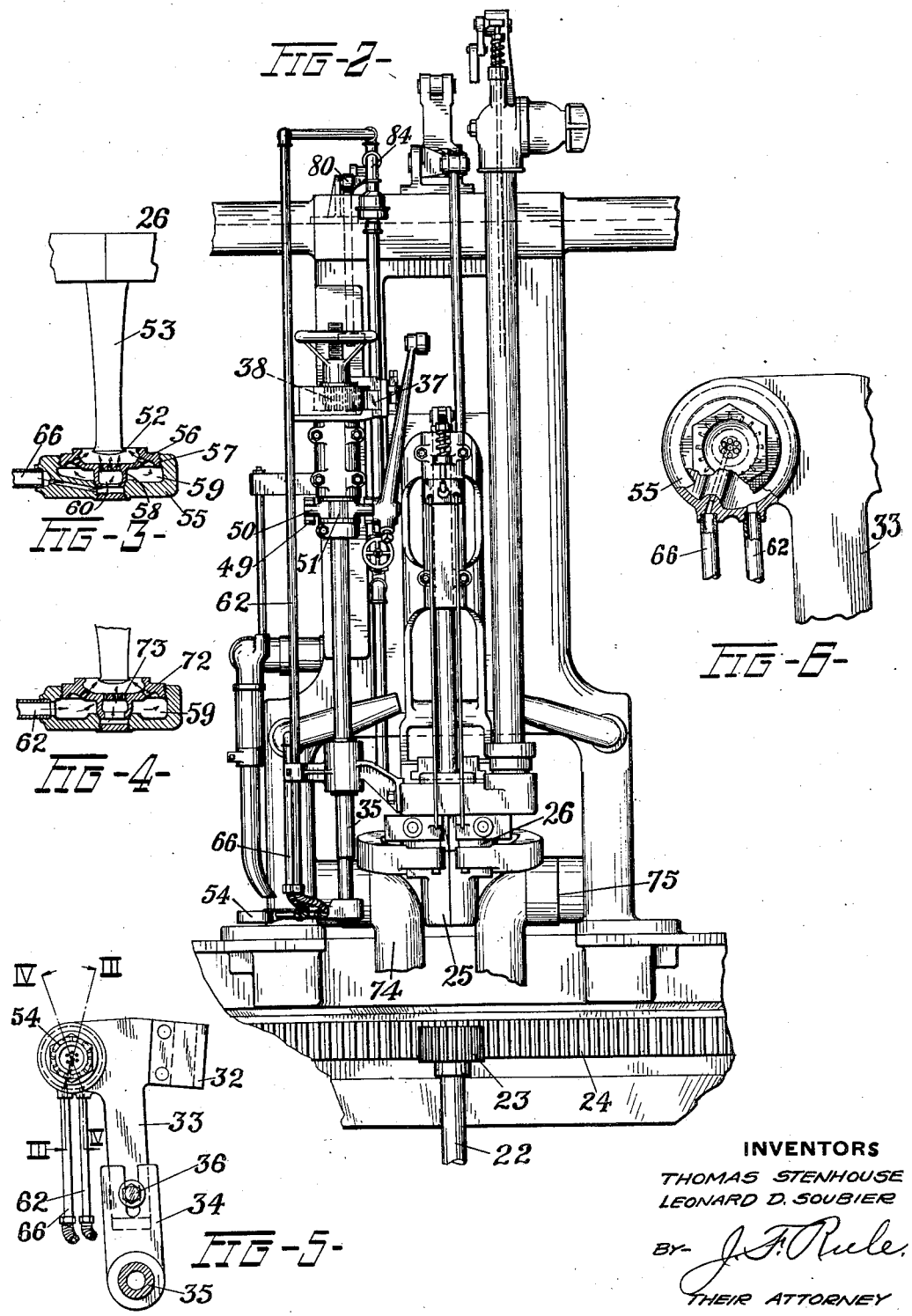

1,534,036

UNITED STATES PATENT OFFICE.

THOMAS STENHOUSE, OF WASHINGTON, PENNSYLVANIA, AND LEONARD D. SOUBIER, OF TOLEDO, OHIO, ASSIGNORS TO THE OWENS BOTTLE COMPANY, OF TOLEDO, OHIO, A CORPORATION OF OHIO.

GLASS-FORMING MACHINE.

Application filed September 29, 1922. Serial No. 591,246.

*To all whom it may concern:*

Be it known that we, THOMAS STENHOUSE, a citizen of the United States, residing at Washington, in the county of Washington and State of Pennsylvania, and LEONARD D. SOUBIER, a citizen of the United States, residing at Toledo, in the county of Lucas and State of Ohio, have invented new and useful Improvements in Glass-Forming Machines, of which the following is a specification.

Our invention relates to improvements in glass forming machines, and particularly to means for preventing the formation in the glassware, of chill marks, scars or other defects due to the chilling or deformation of the plastic glass caused by or incident to the severing of the charge which enters the mold.

The invention is herein disclosed in connection with a bottle blowing machine of the Owens type in which each charge of glass is drawn into its mold by suction, and severed from the supply by a knife moving across the bottom of the mold. The knife forms a temporary closure for the bottom of the mold, while air pressure is momentarily applied to the glass through the upper end of the mold. This air pressure has a tendency to force a slight amount of glass between the knife and the bottom of the mold at the periphery of the mold cavity, so that later when the knife has been withdrawn and the mold opened, leaving the blank suspended from the neck mold, there is a fin of chilled glass surrounding the lower end of the blank. The knife during its severing movement also has a tendency to drag and deform the glass. These defects in the blank produce more or less pronounced defects in the finished article.

An object of our invention is to provide practical means for preventing such defects in the finished ware, and for this purpose there is provided a burner designed to reheat the end of the bare blank after the blank mold has been opened, and melt the chilled glass. In its preferred form, the burner is arranged to direct an annular series of jets of flame directly against the fin of frozen glass surrounding the lower end of the suspended blank, so that said fin is either blown away or entirely remelted. The burner may be mounted on the knife carrying arm.

Other features of the invention will appear hereinafter.

In the accompanying drawings:

Figure 1 is a sectional side elevation of a portion of a bottle blowing machine of the Owens type to which the present invention is applied.

Figure 2 is a front elevation of the same.

Figure 3 is a view showing the burner in section in operative relation to a blank, the section being at the line III—III on Figure 5.

Figure 4 is a similar view taken at the line IV—IV on Figure 5.

Figure 5 is a plan view of the knife arm with the burner attached thereto.

Figure 6 is a fragmentary view of parts shown in Figure 5, but on a larger scale.

Figures 7 to 17 inclusive are diagrammatic views showing successive steps in the operation of gathering a charge of glass and forming and discharging a bottle.

Figure 7 shows the knife severing a charge. In Figure 8 the severing operation has been completed and the knife is in position to form a closure for the end of the mold. In Figure 9 the knife has been lowered and the body blank mold opened, leaving the bare blank suspended from the neck mold. In Figure 10 the knife arm has been advanced to bring the burner directly beneath the blank. In Figure 11 the burner has been moved upward to operative position. In Figure 12 the arm has been lowered and moved to the left, the burner having completed its function. In Figure 13 the knife arm has been entirely withdrawn and the finishing mold brought up to the neck mold. In Figure 14 the finishing mold is closed around the blank to permit the final blowing of the bottle. In Figure 15 the neck mold is opened. In Figure 16 the "knock-out" arm has been brought into engagement with the bottle neck. In Figure 17 the finishing mold is opened and the bottle is being discharged.

Referring particularly to Figures 1 and 2, a portion of a bottle blowing machine of the Owens type is shown. For a full disclosure of the construction and operation of a machine of this type, reference may be had to the patent to LaFrance, Number 1,185,687, June 6, 1916.

The machine comprises a central stationary column 20 on which is mounted the mold carriage 21, rotated continuously by power supplied through a drive shaft 22, connected through gears 23 and 24 to the carriage. On the carriage are a number of units each comprising a blank mold 25, a neck mold 26 and a finishing mold 27, together with mechanism for operating the molds and blowing the bottles.

Each blank mold is carried by a dipping head 28 which, as the mold is brought over the tank 29 of molten glass by the rotation of the carriage, is lowered to bring the lower end of the mold into contact with the glass. The mold is then filled by suction and lifted from the surface of the glass. The string of glass 30 (Fig. 7) extending from the mold is now severed by a blade 32 mounted on a knife arm comprising sections 33 and 34, the latter fixed to a vertical rock shaft 35. The section 33 is adjustable radially in the arm 34 (see Fig. 5) and is clamped in position by a bolt 36, which when loosened also permits removal of the arm 33.

The shaft 35 is rocked by means of a rack bar 37 which meshes with a gear 38 on said shaft. The rack bar is reciprocated in a horizontal direction radially of the machine by means of a stationary cam 39, supported on the column 20. A cam roll 40 running on the cam 39 is carried by a slide block 42 connected through a link 43 to the rack bar 37. The cam 39 is so shaped that it will effect the horizontal movements of the knife arm, hereinafter pointed out.

Vertical movements are imparted to the rock shaft 35 and knife arm by means of a cam 44 on which runs a roll 45 carried by a slide bar 46, connected through a link 47 to an arm 48 of a bell crank. The other arm 49 of the bell crank is in the form of a yoke engaging pins 50 carried by a sleeve 51 on the rock shaft 35. This connection permits the rock shaft to be moved up and down by the arm 48 while permitting independent rocking movement of the rock shaft.

After the blank mold 25 has received its charge it is lifted, as indicated in Figure 7, and the rock shaft 35 rotated to advance the cutter 32 across the bottom of the mold (Figs. 7 and 8), thereby severing the glass. A puff of air is now applied to the blank through the initial blow opening formed in the usual way in the upper end of the blank. This serves the usual purpose of compacting the glass in the mold and shaping the neck of the bottle. This initial blowing has a tendency to force the glass outward between the bottom of the mold and the blade 32 at the lower peripheral edge of the mold cavity, thereby forming more or less of a rib or fin 52 of glass on the lower end of the blank 53.

After this initial blowing, the cam 44 operates to move the cutter vertically downward away from the blank mold, which is then opened by a cam 61, leaving the bare blank 53 suspended from the neck mold 26 (Fig. 9). The cam 39 then operates to rotate the rock shaft and move the knife arm 33 to the Figure 10 position in which a burner 54 carried by said arm is brought directly beneath the blank. The arm 33 is then lifted to bring the burner to operative position.

The burner, as shown in detail in Figures 3 to 6, comprises a body 55 and a removable head 56 having a screw threaded connection 57 in the body 55. The head 56 has a central hollow extension 58 which seats on the part 55. There is thus provided an annular gas chamber 59, surrounding an air chamber 60 formed by the extension 58. Gas is supplied to the chamber 59 through a pipe line 62, which leads to a gas chamber 63 (Fig. 1). The supply of gas from the chamber 63 to the burner is controlled by a valve 64.

Air is supplied to the burner through a pipe 66 communicating with the air chamber 60 in the burner. The pipe 66 is connected to a horizontal pipe 67 (Fig. 1) which in turn is connected to a vertical hollow standard 68 of the mold carriage, the latter connected with an air drum 69, as is usual in this type of machine.

The burner is provided with an annular series of passageways or nozzles 72 extending upwardly and inwardly from the gas chamber 59 so that the gas is discharged in an annular series of upwardly converging jets or small streams. Air from the chamber 60 is directed upward through vertical openings 73 and mixes with the issuing gas. This burning gas applies an intense heat to the lower end of the blank 53, the heat and pressure being directed against and concentrated on the lower end surface of the blank and particularly the fin 52. This fin of glass which is usually very thin and has been chilled by the mold so that it is hard and brittle, is partly or wholly blown away by the force of the burning gas, and any portion that is not removed in this way is remelted and reincorporated in the body of the blank.

The burner serves further to soften the end of the blank to such an extent that it readily conforms to the finishing mold when blown therein, so that the effects of any chilling or scarring of the glass due to the cutting operation are entirely eliminated from the finished ware. The pressure of the gas, moreover, acts to a certain extent as a support for the suspended glass and prevents undue sagging of the lower end of the blank, which otherwise takes place at times, particularly where the blank is of considerable size.

After the burner has operated in the manner above set forth, the knife bar is lowered (Fig. 12) and then is swung to one side to permit the finishing mold 27 to be brought up. The finishing mold which is carried by an arm 74, pivoted at 75, and supported on a cam track 76, now swings up and is closed around the blank. The blank is then blown, the mold opened, a "knock-out" arm 71 brought into engagement with the bottle, and the bottle discharged from the machine in the usual way.

When the burner is not in use, the supply of gas is cut off or reduced by closing the valve 64. The valve is closed by a spring 77 and opened by a lever 78, the latter operated by a bell crank lever 79, pivoted at 80, the bell crank lever being operated by a stationary cam 81. The bell crank 79 may also operate the valve 82 controlling the supply of air from an air pressure chamber 83 through a pipe line 84 leading to the blowing head through which air is supplied for blowing the bottles in the molds. With the construction shown, the air valve 82 is open while the valve 64 controlling the gas supply is closed and vice versa. Obviously, however, the supply of gas to the burner might be controlled entirely independently of the air supply for blowing the bottles. The valve 64 is provided with a small opening 85 permitting a restricted flow of gas sufficient to maintain a pilot light in the burner when the latter is out of operation.

The invention is shown by way of example in connection with a suction gathering machine, but it will be understood it is adapted for use with other types of machines, and also for use in the manufacture of various kinds of ware.

Modifications in the construction of the burner and its operating mechanism may also be resorted to within the spirit and scope of our invention.

What we claim is:

1. In a glass forming machine, the combination of a blank mold in which a blank of glass is formed, means for opening the mold and suspending a bare blank of glass, and means to project an annular series of converging jets of flame against the free end of the blank.

2. In a glass forming machine, the combination of a mold, means to introduce a charge of molten glass into the mold, means to suspend the molded glass in the form of a bare blank, and means to apply pneumatic pressure upwardly against the lower end of the suspended blank sufficient to provide a substantial support for the blank and control its length.

3. In a glass forming machine, the combination of a mold, means to introduce a charge of molten glass into the mold, means to suspend the molded glass in the form of a bare blank, and means to direct a current of gas upwardly against the lower end of the suspended blank with sufficient force to form a substantial support for the blank and control its length.

4. In a glass forming machine, the combination of a mold, means to introduce a charge of molten glass from a supply body into the mold, means for severing the glass in the mold from the supply body, means to suspend the molded glass in the form of a blank with the severed end down, and a burner constructed and arranged to direct an inwardly and upwardly converging annular flame against the lower peripheral edge of the suspended blank, said flame being localized at said edge and end.

5. In a glass forming machine, the combination of a mold, means to introduce a charge of molten glass therein, a knife, means to move the knife across the end of the mold and thereby sever the charge, and means operable by a combined heating and blowing operation, applied to the blank after the mold is opened, to remove the fin of glass formed between the knife and the periphery of the mold cavity.

6. In a glass forming machine, the combination of a mold, means to introduce a charge of molten glass therein, a knife, means to move the knife across the end of the mold and thereby sever the charge, and means to remove the fin of glass formed between the cutter and the mold by the application of a localized flame directed against said fin.

7. In a glass forming machine, the combination of a mold, a rock shaft, means to introduce a charge of molten glass from a supply body into the mold, a cutter carried by the rock shaft and operable to sever the charge of glass in the mold from the supply body, a burner carried by the rock shaft, and means to rock said shaft and thereby bring the cutter and burner alternatively into operative relation to the mold.

8. In a glass forming machine, the combination of a mold, means to dip the mold into molten glass and charge it by suction, a cutter, means to move the cutter across the lower end of the mold to sever the glass, means to open the mold, a burner, and means to move the burner into operative relation to the glass after the mold is opened.

9. In a glass forming machine, the combination of a mold, means to charge the mold by suction, a rock shaft, a cutter carried thereby, means to rock said shaft and thereby swing the cutter across the end of the mold to sever the glass, means to open the mold after the glass is severed, and a burner carried by said rock shaft and moved thereby into operative relation to the glass after the mold is opened.

10. In a glass forming machine, the combination of a mold, means to dip the mold into molten glass and charge it by suction, a cutter, means to move the cutter across the lower end of the mold and sever the glass, means to open the mold, a burner, and means to move the burner into operative relation to the glass after the mold is opened, said burner constructed and arranged to apply a localized flame to the severed end of the bare blank.

11. In a glass forming machine, the combination of a mold, means to dip the mold into molten glass and charge it by suction, a cutter, means to move the cutter across the lower end of the mold and sever the glass, means to open the mold, and a burner comprising an annular series of openings arranged to direct an annular flame against the lower peripheral edge of the blank after the mold is opened.

In witness whereof we have hereunto affixed our signatures, the 2nd and 25th days of September, 1922.

THOMAS STENHOUSE.
LEONARD D. SOUBIER.